Jan. 18, 1944. J. E. HALE 2,339,542
TIRE AND WHEEL ASSEMBLY
Filed Oct. 9, 1940

INVENTOR
James E. Hale
BY Ely + Frye
ATTORNEYS

Patented Jan. 18, 1944

2,339,542

UNITED STATES PATENT OFFICE 2,339,542

TIRE AND WHEEL ASSEMBLY

James E. Hale, Akron, Ohio, assignor to The Firestone Tire & Rubber Company, Akron, Ohio, a corporation of Ohio Application October 9, 1940, Serial No. 360,378

3 Claims. (Cl. 152—401)

This invention relates to improved pneumatic tire and wheel constructions, especially to such constructions adapted to resist deflation and to be run even though the pneumatic tire is deflated, or has bullet holes therein.

Appreciable work has been done relative to the construction of pneumatic tires and tubes which cannot be punctured. Such tubes are particularly important in army vehicles wherein it is imperative that the vehicle's operation cannot be stopped by puncturing the inflated tire and tube. This work has mainly comprised providing puncture-proof tubes of various types to be used in connection with the tires. These tubes are not absolute guarantees against the deflation of the tire, and when these tires are deflated, continued operation of the tire not only necessitates driving the tire at greatly reduced speed, but also actually pulls the deflated tire and tube off of the rim on many occasions.

The general object of the present invention is to provide a bullet-proof tire and tube assembly wherein the tire is positively held on its associated wheel, even though deflated.

A further object of the invention is to provide a safety member on a split-wheel construction whereby a tire positioned on the wheel is positively engaged therewith.

A further object of the invention is to provide an inexpensive, easily manufactured pressure ring for a pneumatic tire, which ring is adapted to hold a tire on a rim.

Still another object of the present invention is to provide a novel, foolproof means to insure a pneumatic tire and tube remaining in position upon a given wheel construction even though operated when the tire thereon is deflated.

Figure 1:
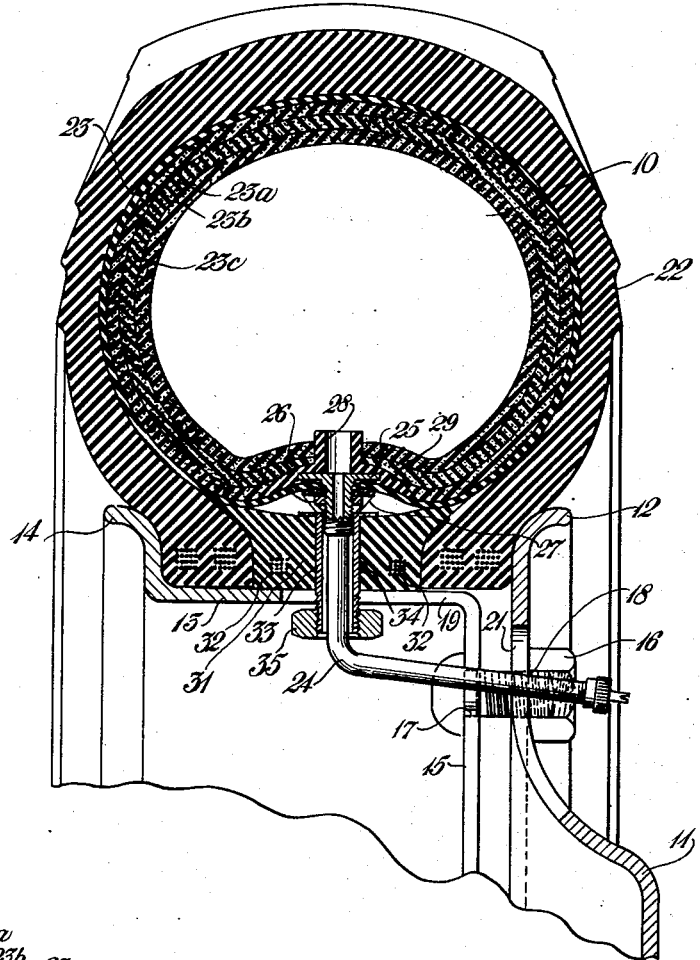
Figure 2:
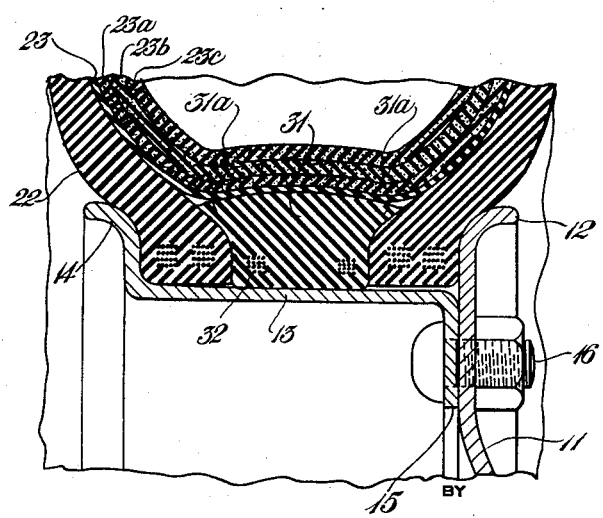

The above and other objects of the present invention will be manifest from the following specification, which is described with particular reference to the accompanying drawing, in which:

Figure 1 is a vertical sectional elevation of a wheel assembly of the invention with the parts thereof being in the first stage of the assembly thereof; and Figure 2 is a vertical sectional elevation similar to Figure 1, through a different portion of the embodiment of the invention, after the wheel assembly has been completed.

The present invention, broadly speaking, comprises mounting a standard bullet proof, or puncture sealing tube in a standard pneumatic tire that is positioned upon a split wheel with a solid rubber pressure ring being received between the beads of the tire, which ring is compressed between the tire beads when the split wheel is secured in operative position. Means are provided for securing the pressure ring positively to the split wheel to prevent relative movement therebetween whereby the tire is held upon the wheel by the compression of the pressure ring and the wheel assembly as a whole is adapted to be run even though the tube is deflated, without the tire being pulled from the wheel assembly. Hence it is seen that the pneumatic tire and wheel assembly of the invention not only is adapted to resist being punctured but is adapted to retain the tire and tube in their proper positions even if operated after deflation should happen to occur. The combination gives absolute insurance against tire trouble such as would necessitate stopping the vehicle mounted on the wheel assembly.

Referring specifically to the apparatus shown in Figure 1, it comprises a wheel assembly 10 that includes a wheel disk 11 having a tire engaging flange 12 at its outer edge. The wheel disk 11 combines with an annular rim section 13 having an outwardly directed tire engaging flange 14 at one edge thereof and a radially inwardly directed flange 15 adapted to abut against a portion of the wheel disk 11 formed at the other edge thereof. Bolts 16 extend through holes 17 provided in the flange 15 of the rim section 13 and holes 18 provided in the wheel disk 11 to secure the wheel disk and rim section together to form a split rim and wheel unit. Bolts 16 are of sufficient length to permit the rim section 13 to be laterally spaced an appreciable distance from the wheel disk 11 when the bolts extend loosely between the wheel disk and rim section. A valve receiving slot 19 is formed in the flange 15 of the rim section 13 which slot extends over half-way in through the section 13, as shown. A corresponding slot 21 is formed in the wheel disk 11 and is adapted to be aligned with the slot 19 when the wheel is assembled.

A pneumatic tire 22 of any standard construction is positioned upon the split wheel formed by the rim section 13 and wheel disk 11 and receives a tube 23 therein. Preferably this tube is a bullet-proof, or other type of non-deflatable tube, since the object of the invention is to provide a pneumatic tire carrying wheel assembly which cannot ordinarily be punctured, and, if punctured, cannot be removed or pulled off of its associated wheel merely by continued use thereof. The tube 23 has three layers 23ª, 23ᵇ, and 23ᶜ of sticky unvulcanized rubber on its inner surface, which rubber has a large percentage of oil therein to make it soft and increase its stickiness. The rubber also may have a small amount of vulcanizing material plus a small amount of acid to retard the action of the vulcanizer compounded in it. This tube 23 has a valve stem 24 extending therefrom, which has an enlarged head 25 that is embedded within the tube 23. A nut 26 engages with the outer surface of the valve stem at the base thereof to force a metallic bridge member 27 tightly against the outer surface of the tube. A tubular rubber extension member 28 having an outwardly directed flange 29 at one end is embedded in the rubber layers 23ª, 23ᵇ, and 23ᶜ, with the flange 29 abutted against the base of the valve 24. The tubular portion of the rubber member 28 is aligned with the aperture through the valve stem to form an air passage into the interior of the tube. When a bullet or other article punctures the tube, the sticky rubber layers function to seal such puncture. Note that the inner end of the tubular member 28 extends radially inwardly of the inner surface of the sticky layer 23ᶜ to prevent its base from being clogged by the sticky rubber.

The tire 22 is fixedly secured to the split wheel assembly through a solid rubber pressure ring 31, which ring is snugly received on the rim section 13 and extends between the beads of the tire 22 held on the rim by the wheel disk 11. The pressure ring 31 has a greater transverse width than the distance between the beads of the tire 22 when it is positioned for operation upon the wheel assembly 10. Radial expansion of the pressure ring 31 is prevented by bead rings 32 that are embedded in the pressure ring adjacent the inner corners thereof. These bead rings 32 are made from a plurality of individual rubber covered wires. A tubular bolt 33 extends through a hole 34 formed in the pressure ring 31 and this bolt extends through the slot 19 in the rim section. Then, when nut 35 of bolt 33 is tightened down against the lower surface of the rim section, it draws the head of the bolt tightly against the upper surface of the pressure ring 31, whereby the pressure ring is fixedly secured in position and relative movement between the pressure ring and rim section is prevented. Of course, this bolt 33 is not tightened into position until after the bolts 16 have been tightened down, which action forces the beads of the tire 22 towards each other. The valve stem 24 extends through the base of bolt 33 and may be bent over as shown to extend through the hole 21 in the wheel disk and expose the valve carrying portion thereof.

Figure 1 shows the initial, unstressed condition of the tire 22 and pressure ring 31, while Figure 2 shows a pressure ring and tire section after the the wheel disk has been tightened up or abutted against the rim section 13. Such action forces the sides of the pressure ring 31 together and bulges out the center portion of the pressure ring. In all events, the tire beads are fixedly held against the tire retaining flanges formed in the wheel assembly 10. Note that the upper surface of the pressure ring 31 has outwardly extending flanges 31ª formed thereon, which edge portions aid in anchoring the tire beads in place. These flanges 31ª overlie the inner edges of the tire beads and aid the ring 31 in supporting the tire for rotation without damage thereto even though operated with the tube deflated.

From the foregoing, it will be evident that a novel and improved pneumatic tire and wheel assembly has been provided by the invention. Such construction does not require any special members to assemble or disassemble same and is of inexpensive construction throughout, whereby the objects of the invention have been achieved.

It will be realized that the pressure ring and split wheel construction of the invention can be used without providing a puncture-proof tube therefor, but that provision of such tube for the wheel assembly adds to the general purpose of the tire, whereby its deflation is generally prevented, but if not prevented the tube provides cushioning means to limit the distance of side wall fold-back under load. If deflation occurs, it is particularly important that the tire is retained upon the wheel even though the wheel is used an appreciable time. However, the pressure ring 31 of the invention is valuable in all tire and wheel constructions, since it positively engages the tire with the wheel, which action is not secured in ordinary pneumatic tire and wheel assemblies. Note that the pressure ring is substantially as thick as the radial height of the tire engaging flanges 12 and 14.

It will be appreciated that the foregoing description of the invention is for illustrative purposes only and that the scope of the invention includes modifications thereof such as come under the scope of the appended claims.

What is claimed is:

1. In a pneumatic tire tube, and wheel assembly adapted to be run when deflated, a circumferentially split rim having bead engaging flanges at the edges thereof, a tire received on said rim with the beads thereof engaged with said flanges, a solid, resilient, substantially all rubber pressure ring transversely larger than the distance between the inner surfaces of said tire beads when said tire is mounted on said rim with the sections of said rim being abutted, said pressure ring extending radially outwardly of the wheel substantially to the outer edges of said flanges and provided at each side with an outwardly directed lip overlying a portion of the adjacent beads, said pressure ring being received on said rim between the beads of said tire, metal reinforcing means embedded in said pressure ring for preventing circumferential expansion thereof, and a tubular clamping bolt extending through the pressure ring to secure said pressure ring against rotation on said rim and to provide an outlet for the valve stem of said inner tube, said pressure ring being compressed between the beads of said tire when the device is assembled to exert an axial outward pressure on the beads whereby such pressure plus said bolt clamping pressure retain said tire and said pressure ring against slippage on said rim even when said tire is run when deflated.

2. In a pneumatic tire, inner tube, bead lock, rim and wheel assembly of the class described, a bead lock consisting of an annular rubber body portion, said body portion having a tubular bolt extending radially therethrough, said tubular bolt having a permanent head and a longitudinally extending hole throughout its length, said hole being of sufficient size to provide an outlet for the valve stem of said inner tube through said bead lock.

3. In a pneumatic tire, inner tube, bead lock, rim and wheel assembly of the class described, a bead lock consisting of an annular rubber body portion, said body portion having a tubular bolt extending radially therethrough, the head portion of said bolt being associated with the upper surface of said body portion and the threaded end of said bolt projecting radially inwardly from the body portion, said projecting end being adapted to be projected radially inwardly through a valve hole in said rim and to receive a nut in threaded relation thereon, whereby means for bolting said body portion to said rim is provided, said tubular bolt having a longitudinally extending hole therethrough, said hole through said bolt being of sufficient size to provide an outlet for the valve stem of said inner tube through said bead lock and rim.

JAMES E. HALE.